US006504702B1

(12) United States Patent
Noll

(10) Patent No.: US 6,504,702 B1
(45) Date of Patent: Jan. 7, 2003

(54) IONIZER FOR STATIC ELIMINATION IN VARIABLE ION MOBILITY ENVIRONMENTS

(75) Inventor: Charles G. Noll, Sellersville, PA (US)

(73) Assignee: Illinois Tool Works Inc., Glenview, IL (US)

( * ) Notice: Subject to any disclaimer, the term of this patent is extended or adjusted under 35 U.S.C. 154(b) by 41 days.

(21) Appl. No.: 09/762,521

(22) PCT Filed: Jun. 2, 2000

(86) PCT No.: PCT/US00/15444

§ 371 (c)(1), (2), (4) Date: Feb. 8, 2001

(87) PCT Pub. No.: WO01/09999

PCT Pub. Date: Feb. 8, 2001

Related U.S. Application Data

(60) Provisional application No. 60/146,544, filed on Jul. 30, 1999.

(51) Int. Cl.$^7$ .......................... H05F 3/00; H01H 47/00; H02H 1/00; G01N 27/62

(52) U.S. Cl. ....................... 361/229; 361/226; 361/220; 361/212; 361/213; 324/464

(58) Field of Search ................................ 361/220, 229, 361/226, 212, 213; 324/464; 250/284; 95/65

(56) References Cited

U.S. PATENT DOCUMENTS 3,626,182 A * 12/1971 Cohen ........................ 250/283
3,812,559 A 5/1974 Spindt et al. ................. 445/52
4,132,567 A * 1/1979 Blackwood .................... 134/1
4,259,707 A * 3/1981 Penney ....................... 361/212
5,017,876 A * 5/1991 Wright et al. ............... 324/464
5,249,094 A * 9/1993 Hayakawa et al. ......... 361/229
5,296,018 A * 3/1994 Suzuki .......................... 95/65
5,719,739 A * 2/1998 Horiguchi ................... 361/220
5,847,917 A * 12/1998 Suzuki ....................... 361/213
6,259,591 B1 * 6/2000 Pitel et al. .................. 361/212
6,407,382 B1 * 6/2000 Spangler ..................... 250/286

* cited by examiner

*Primary Examiner*—N. Le
*Assistant Examiner*—Wasseem H. Hamdan
(74) *Attorney, Agent, or Firm*—Akin, Gump, Strauss, Hauer & Feld, L.L.P.

(57) ABSTRACT

An ionizer that creates a corona current distribution having a balanced flow of positive and negative ions in a variable ion mobility gaseous environment, such as an environment of substantially nitrogen. The balanced flow of positive and negative ions is directed toward a workspace or target located in the gaseous environment downstream from the ionizer. The ionizer includes a counterelectrode, a positive ion emitter, a negative ion emitter, and a control circuit. The counterelectrode has at least two spatially isolated collecting surfaces. The positive and negative ion emitters are spatially isolated from each other so that the outputs of each of the emitters do not reach the other emitter.

17 Claims, 22 Drawing Sheets

IONIZER FOR STATIC ELIMINATION IN VARIABLE ION MOBILITY ENVIRONMENTS

CROSS-REFERENCE TO RELATED APPLICATIONS

This application claims the benefit of priority of U.S. Provisional Application No. 60/146,544 filed Jul. 30, 1999, entitled "Balanced Static Elimination In Variable Ion Mobility Environments".

BACKGROUND OF THE INVENTION

The present invention relates generally to electrical ionizers that produce stable charge-carrier production in gases with varying concentrations of electron attaching components. More particularly, the invention relates to ionizers suited for production test environments of semiconductor devices and component handlers and other environments that might be rendered inert by nitrogen and noble gases. In these environments, the mobility of gaseous charge carriers changes with gas composition and temperature.

Nitrogen gas is used to inert processes in many industries, and can purge areas cooled by the evaporation of liquid nitrogen. In recent years, static eliminators using nuclear (radioisotope), ultraviolet, soft x-ray, and corona discharge ionizers have been explored for use in nitrogen environments. The ionizers in static elimination equipment produce positive and negative charges that have the mobility needed to be drawn to static (stationary or fixed), unbalanced electric charges on surfaces. Controlled production of these gas-borne charge carriers is critical to static elimination.

The characteristics of electrical corona in high-purity nitrogen gas have been known for many years. To gain fundamental data on these corona, effort must be made to purify the nitrogen gas and to obtain cleanliness of the chamber, especially against in-leakage and outgassing. The negative charge carriers formed in the discharge are free electrons and these do not readily attach to atomic or molecular nitrogen species. As a result, the mobility of the negative charge carriers is about 1000 times that for the positive charge carriers. In industrial applications the impurity level is less controllable and often unknown. Then, free electrons will attach to oxygen and other electronegative impurities. Negative carrier mobility, which influences factors that determine performance of an ionizer such as ion currents, sparkover conditions, and migration of charge, can change significantly with the composition of the environment. The carrier mobility also depends upon temperature. To serve the static elimination goals of industrial applications successfully, the ionizer must be sufficiently controllable over the variability in ion mobility.

Each of the alternative technologies (nuclear, UV, x-ray) produces positive ion and free electron pairs in nitrogen. The balance of these ionizers, however, is not easily controlled in air, let alone dilute air-nitrogen gas mixtures and over the temperature range of interest here—213 to 433 K. Also, the alternative ionizers can introduce hazards to the work place. An electrical ionizer is, therefore, preferred if its balance can be controlled.

The injection of electron attaching species in the vicinity of the corona discharge was proposed recently towards stabilization of the corona. This method can serve applications that can tolerate gas injection and the added cost of a gas handling system. Success of this method diminishes at low temperatures where there is an additional burden of a high level of drying and filtration of the injected gas. The present invention eliminates the need for an injection-gas handling system and is applicable to broader temperature and conditions of gas contamination.

The environmental chamber, used to test the invention, is a commercial semiconductor device handler and tester. This chamber is heated by electrical methods and cooled by the evaporation of liquid nitrogen. Excellent control of the temperature is achieved (less than ±1 K), and gas flows are maintained in the equipment both to gain temperature uniformity and to convey charge carriers. Apart from the challenges of the thermal environment, nitrogen poses very different conditions for static elimination than those for operation in air. Also, the mechanical complexity of the equipment sets additional challenges for balanced static elimination. Although the test environment is complex, the semiconductor device handler offers a flexible environment for the development of static eliminators.

It is, therefore, the purpose of this invention to provide an ionizer that can be balanced under conditions of variable ion mobility and complex mechanical constraints. Although tested in the environment of a device handler, the resulting ionizer is appropriate for use in other industrial applications with similar requirements.

SUMMARY OF THE INVENTION

The present invention provides an ionizer that creates a corona current distribution having a balanced flow of positive and negative ions in a variable ion mobility gaseous environment. The balanced flow of positive and negative ions is directed toward a workspace or target located in the gaseous environment downstream from the ionizer. The ionizer comprises a counterelectrode, a positive ion emitter, a negative ion emitter, and a control circuit. The counterelectrode serves the counterelectrode function for the corona emitters. It isolates the emitter-current distributions, so that current is prevented from passing from the negative polarity emitter to the positive-polarity emitter and vice versa. Although complete isolation is not possible the current is so limited as to allow each emitter-counterelectrode set to operate independently. The positive ion emitter directs positive ions towards only a first ion-collecting surface of the counterelectrode. The negative ion emitter directs negative ions towards only a second ion-collecting surface of the counterelectrode. The positive and negative ion emitters are spatially isolated from each other so that the outputs of each of the emitters do not reach the other emitter. The control circuit controls the output of at least one of the positive and negative emitters so as to cause a balanced flow of positive and negative ions to be emitted from the ionizer and directed towards the workspace or target. This creates a static-free environment at the workspace or target.

The control circuit comprises a positive voltage controlled power supply, a negative fixed voltage potential current limiting power supply, and a balance sensor. The positive voltage controlled power supply controls the positive ion emitter. The negative fixed voltage controlled potential current limiting power supply controls the negative ion emitter. The balance sensor is located near the workspace or target. The output of the balance sensor is used to control the positive power supply. Proper control of the positive power supply by the balance sensor maintains a balanced ion state near the workspace or target. The control circuit may increase the voltage from the positive voltage controlled power supply for control of the positive ion emitter when environmental temperature decreases.

The ionizer emitters may be configured to have point-to-plane geometry. In the point-to-plane geometry, the counterelectrode is a single plane having two opposing ion collecting surfaces, and the positive and negative ion emitters are needle electrodes. The needle-to-tube ionizer emitter construction comprises a counterelectrode, and positive and negative emitters. The counterelectrode includes a first tube and a second tube. The positive and negative ion emitters are needle electrodes. The positive needle electrode is disposed in the first tube wherein the positive ions are directed towards the inside surface of the first tube. The negative needle electrode is disposed in the second tube wherein the negative ions are directed towards the inside surface of the second tube. The first and second tubes may be cylindrically shaped stainless steel tubes having a Fiberglass G-7 insulation barrier.

The positive ion emitter and the negative ion emitter each have a tip that may be directed downstream from the ionizer.

In the point-to-plane arrangement, the positive ion emitter and negative ion emitter may each include a supporting tube that supports the emitters and allows rotational positional adjustment. The rotational positional adjustment of the emitters allows for the independent operation and forward projection of the balanced flow of positive and negative ions towards the workspace or target. Additionally, the supporting tube may be used as an air plenum for gas-injection into the environment.

Another embodiment of the present invention provides a method of creating a corona current distribution having a balanced flow of positive and negative ions which are directed toward a workspace or target. In the method, a variable ion mobility gaseous environment is provided. The workspace or target is located in the gaseous environment. An ionizer is operated in the gaseous environment to create the corona current distribution. The workspace or target is located downstream from the ionizer. The ionizer includes a positive ion emitter and a negative ion emitter. The negative ion emitter is controlled with a negative fixed voltage potential current limiting power supply. The positive ion emitter is controlled with a positive voltage controlled power supply based on the output signal of a balance sensor located near the workspace or target so as to cause a balanced flow of positive and negative ions to be emitted from the ionizer and directed towards the workspace or target. This process creates a static-free environment at the workspace or target.

Another embodiment of the present invention provides a method of creating a corona current distribution having a balanced flow of positive and negative ions which are directed toward a workspace or target. In the method, a variable ion mobility gaseous environment is provided. The workspace or target is located in the gaseous environment. An ionizer is operated in the gaseous environment to create the corona current distribution. The workspace or target is located downstream from the ionizer. The ionizer includes a counterelectrode, a positive ion emitter, a negative ion emitter, and a control circuit. Positive ions are directed from the positive ion emitter towards only a first ion collecting surface of the counterelectrode. Negative ions are directed from the negative ion emitter towards only a second ion collecting surface of the counterelectrode. The positive and negative ion emitters are spatially isolated from each other so that outputs of each of the emitters do not reach the other emitter. The control circuit controls the output of at least one of the positive and negative emitters so as to cause a balanced flow of positive and negative ions to be emitted from the ionizer and directed towards the workspace or target, thereby creating a static-free environment at the workspace or target.

BRIEF DESCRIPTION OF THE SEVERAL VIEWS OF THE DRAWINGS

The invention can be understood through consideration of the following drawings.

DETAILED DESCRIPTION OF THE INVENTION

The present invention addresses the deficiencies of conventional electrical ionizers as described above through electrical isolation of the emitter sets and an improved electrical control method. In order to understand the invention, it is helpful to appreciate the electrical operation of ionizers of the prior art. This description also affords the opportunity to illustrate the arrangement of ionizers for test.

Figure 1A:
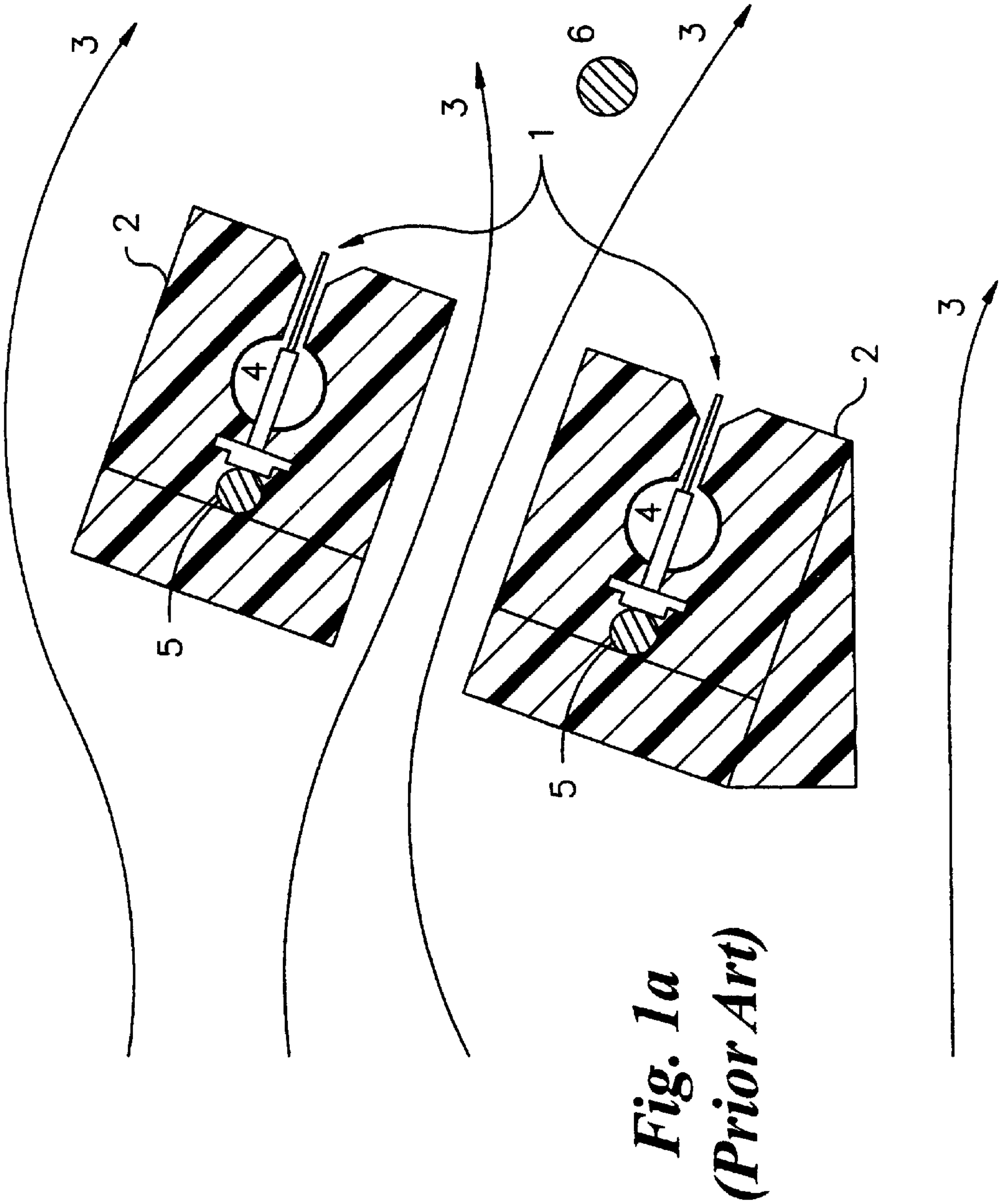
Fig. 1a (Prior Art)
FIG. 1*a* is a cross-sectional view of a gas-purged static bar generically representing a needle-to-needle electrode set of the prior art.

FIG. 1*a* illustrates a cross-sectional view of a gas-purged ionizer of the prior art. It generically contains a point-to-point emitter set 1 mounted within an insulation system 2. The emitter tips are flush with the surface of the insulation system and positioned within a conical taper to stabilize corona generation. The emitters are fabricated from tungsten wire with a nominal diameter of 0.25 mm and spaced 28.5 mm apart. The insulation system is fabricated from G-11 fiberglass. A difference in electrical potential is placed between these emitters at 5 so that each might serve as a source for corona discharge. The potential difference is typically 2 kV to 20 kV for the ionizer in FIG. 1*a* and depends upon temperature and gaseous environment. Corona discharge is defined here as a source of charge carriers resulting from high electrical stresses and partial breakdown in the gas surrounding the emitters. In typical ionizers for static eliminators, the gases in the gaseous environment 3 surround or flow past the emitter needles 1. The insulation system 2 is used to support the ionizers and to maintain the potential difference between the emitter needles 1. In the prior art, the emitters are usually exposed directly to the gaseous environment 3.

When the environment does not contain electron-attaching components, i.e., is nitrogen or a noble gas, the generated charge-carriers are positive ions and free electrons. The lack of negative ions disturbs the electrical operation of the ionizer. One method to overcome this problem is through the injection of electron attaching gases through or about the emitter needles 1. This method of operating an ionizer is disclosed in copending International Application No. PCT/US99/3045, designating the United States and selected foreign countries, entitled "Gas Purged Ionizers and Methods of Achieving Static Neutralization Thereof", filed Feb. 8, 2000, which is incorporated by reference herein. In the ionizer of FIG. 1*a*, the electron attaching gases are injected through plenums 4 about the emitters. The improvements, disclosed here, make this gas injection unnecessary. In some applications, the injected gas is considered a contaminant.

In some arrangements of the prior art, a sensor 6 is placed in the environment near the ionizers. This sensor samples the ion currents or the potential between the emitters and controls the potentials at 5 to neutralize targets for static elimination. When the gas does not have electron-attaching components, the free-electron current overwhelms the sensor and makes conventional balance methods unsuccessful. The invention herein has an improved method to sense and control the static elimination process.

Figure 1B:
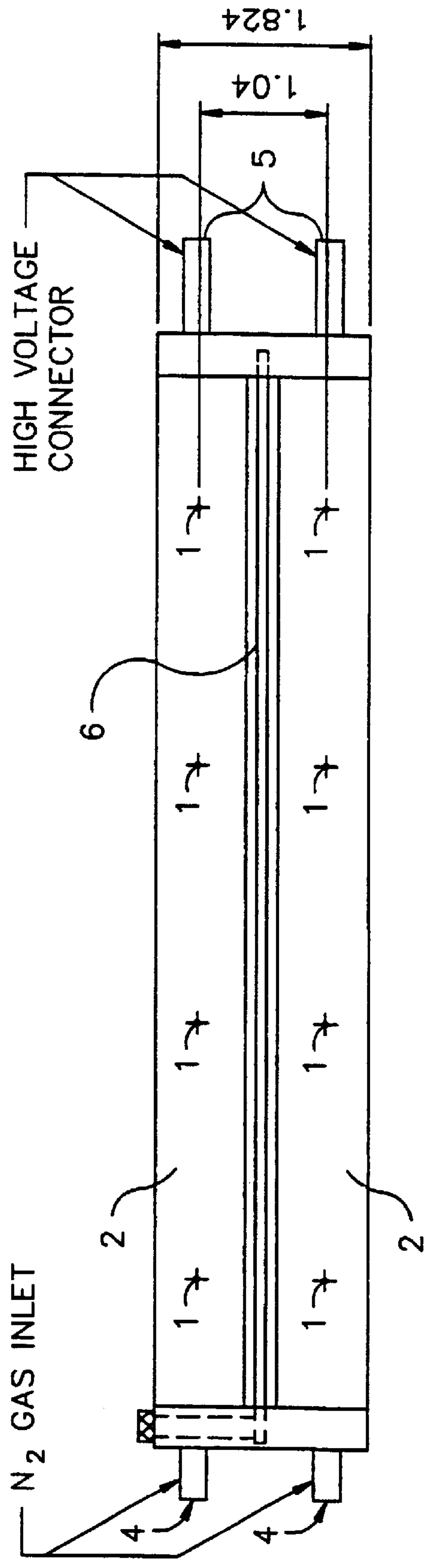
Fig. 1b (Prior Art)
FIG. 1*b* is a side view of an ionizer array (static bar) consisting of gas-purged, needle-to-needle ionizer of the prior art.

Typically, more than one emitter pair is used in commercial electrical ionizers. FIG. 1*b* shows an array of point-to-point ionizers separated by 57.5 mm. Other elements of this ionizer are noted by the numbering used in FIG. 1*a*. Time-averaged emitter currents are measured in the high voltage wires leading to the positive and negative polarity emitter sets of this ionizer. This approach to measurement of the currents is necessary, since most of the current passes between the positive and negative polarity emitters rather than to grounded surfaces. Unfortunately, these current readings contain information on both the positive and negative carrier currents, and therefore, do not yield much useful information on carrier generation for static elimination.

The power supply for this ionizer is typical of those used with air ionizers with few emitters (e.g., Simco/SCS IBC-20). It has current controls and a maximum output that is limited to a few tens of microamperes.

Figure 2:
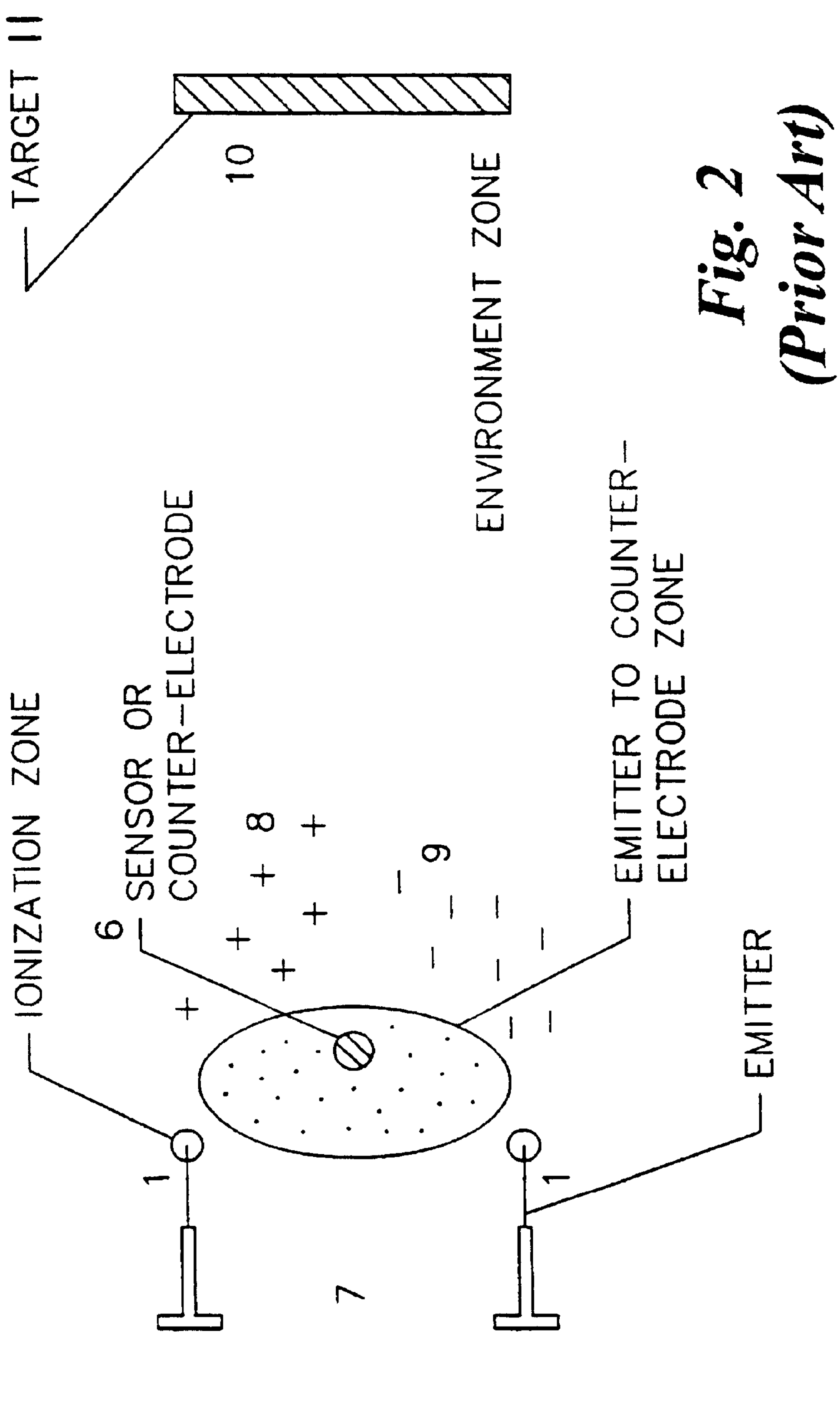
Fig. 2 (Prior Art)
FIG. 2 illustrates the general arrangement for static elimination and ionizer tests of the prior art.

The typical arrangement for test of an ionizer is illustrated in FIG. 2. A static elimination system consists of an ionizer 7 to generate positive 8 and negative 9 gas-borne carriers. These carriers have the mobility to be moved or conveyed by gases in the gaseous environment 3 to articles that bear electrostatic charge 10. Charged articles are either insulators or floating conductors and have the characteristic of containing charge that is isolated from ground by an insulating barrier or is fixed on insulating materials and cannot be conducted to ground. In tests, the article to be neutralized 10 is replaced by a target 11 that has a defined capacitance C, potential with respect to ground V and exposure to the flow of charge carriers in the gas stream. The charge Q on the target is Q=CV.

The target, used for residual potential and charge-decay tests, is a 2.54 cm×15.24 cm Cu-clad, (G-10) glass epoxy plate. The target is about 18 cm from the ionizer. The combined capacitance of the target, cable, and plate of the charged plate monitor (CPM) is 85 pF. The CPM is a component of a computerized data acquisition system.

The balance condition is determined by first grounding the target/CPM-plate system, and then monitoring its potential as it floats ungrounded to a steady-state condition in the test environment. The charge-decay time, CDT, is the time required for the floating (85 pF) target's potential to fall from 1000 V to 100 V. For example, a negative charge-decay time, CDT, is obtained when the target is initially charged to negative polarity. Tests were conducted under balanced conditions, based on 20s float tests before and after each charge-decay measurement.

At ambient and higher temperatures in air, it is found that the charge-decay time depends inversely upon the emitter currents according to a power law of the form:

$$CDT=\alpha I^{-\beta}$$

where CDT is the charge-decay time, I is the emitter current of opposite polarity to that for the charged plate, and (α, β) are constants determined by regression. The parameter β is typically in the range from 0.14 to 0.25, suggesting a weak dependence of charge decay on ionizer current.

At constant current, the reduction in charge-decay time with increasing temperature is largely due to the lower gas density at constant pressure. Fan laws show the speed of gases downstream of a fan depend on the gas density ($v\sim\rho^{-1/2}$), and of course, $\rho\sim T^{-1}$ for ideal gases. Since the charge-decay time appears to be driven by gas flow, the current driven to the target I should go as $T^{1/2}$. Correlation of the charge-decay time at elevated temperature, balance conditions, and −20 μA on the negative-polarity emitters yields the following:

$$CDT_{+}(T)=18.073-0.8242T^{1/2} \text{ corrl. coef.}=0.9911$$

$$CDT_{-}(T)=18.106-0.8246T^{1/2} \text{ corrl. coef.}=0.9984$$

Under normal gas flows, the conveying flow dominates over ion migration in bringing charges to the CPM's target Although the dependence of ion mobility on temperature is typically greater than the density's dependence on temperature, it is the latter that controls charge decay. It is the independence of charge-decay time on polarity that reveals the importance of conveying charge by gas flow, and the lesser importance of carrier mobility.

The reduced temperature environment is essentially a nitrogen environment. Liquid nitrogen is evaporated and the gases purge the chamber during the cooling and temperature maintenance stages. Gaseous nitrogen is also introduced into the chamber prior to cooling to eliminate condensation and freezing. In general, the chamber is under positive pressure during nitrogen cooling. However, the purity of the nitrogen environment appears greater where higher volumes of liquid nitrogen are evaporated—during cooling and at lower temperatures. Small doors are periodically opened to move the device-carrying boats in and out of the test chamber. Air is carried into the chamber during these operations. The dominating effects of free electron currents in nitrogen take place with less than 1% $O_2$ in the chamber.

Figure 3:
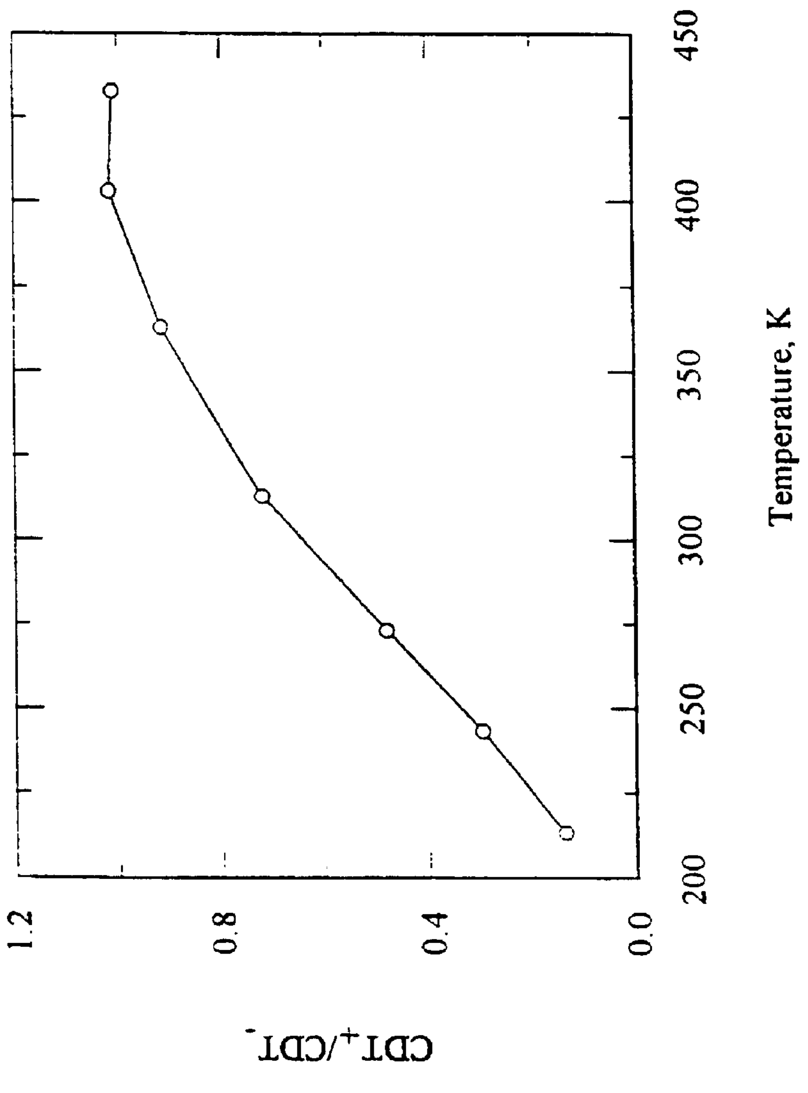
FIG. 3 depicts the charge decay time for the needle-to-needle ionizer.

FIG. 3 shows the ratio of charge-decay times for the positive and negative emitter sets with −20 μA on the negative emitters (Residual potential less than −20 V, total emitter currents≈20 μA). The falloff of this ratio at lower temperature accompanies imbalances of the ionizer.

The residual voltage in the nitrogen environment is unstable and cannot be adjusted through the null level needed for balance control. It also drifts independently of ionizer current. Twenty-second float tests could be achieved at times and typically the residual potential could be maintained within −20 V of zero, even at the lowest temperature. It was found that the charge-decay times typically decrease with increasing currents, but the power law dependence would be a very speculative model for the data in a nitrogen environment.

The data shows that the negative (free electron) current dominates current drawn from the supply and is the primary component of the positive and negative current readings. The instability and poorer fits at low temperature are attributed to the negative current nearly cutting off the generation of positive ionic carriers at the positive emitters. It is likely that the generation of positive carriers is poorly controlled and unknown in the pure nitrogen environment.

Figure 4:
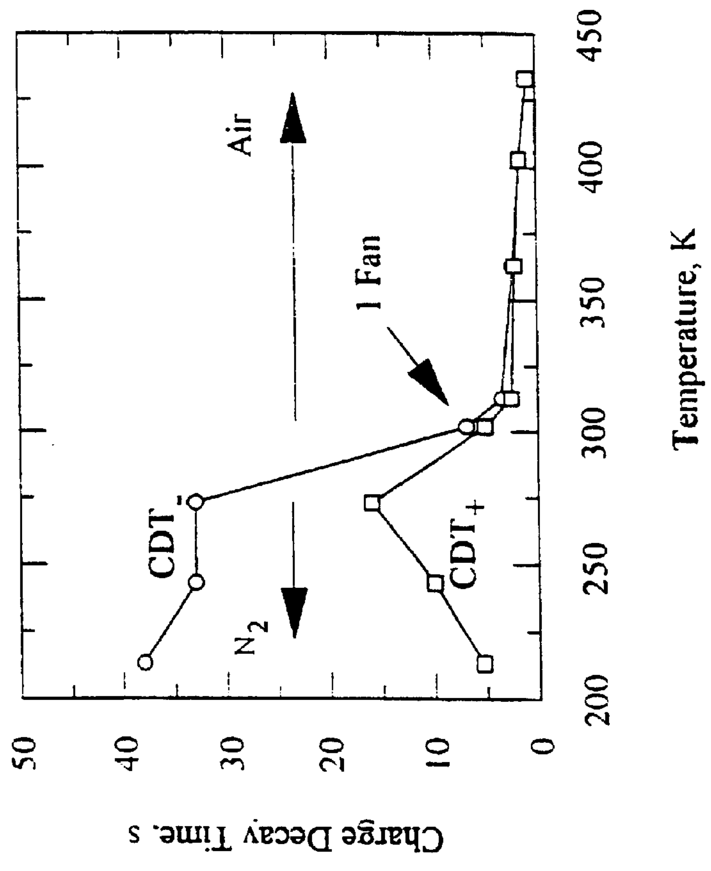
FIG. 4 shows the charge-decay times for the needle-to-needle ionizer at 20 μA per array.

The size of the charge-decay times as a function of temperature is also of interest. These data are plotted in FIG. 4 for a negative ion current of −20 μA.

The contribution of the free electron carriers at low temperature also dominates the gas flow dependence that might otherwise be extrapolated from the data at elevated temperature. However, the charge-decay times observed at higher temperatures are more consistent with charge-decay times at the positive target at lower temperatures, than at the negative target for the same negative emitter currents. This shows that the number of negative carriers reaching the positive target is comparable in both the low temperature nitrogen and high temperature air environments. The number of carriers reaching the negative target is then about one-third this quantity. The ionizer continues to produce a concentration of positive ions that is larger than the free electron concentration and, here, increases with decreasing temperature. The positive ion concentration, however, is much smaller than at room and elevated temperature. From these figures, typically 90% of the positive ion current is pinched off when the environment is changed from air to nitrogen. The measured positive emitter current is then clearly dominated by the free electron current and the remaining positive ion generation is not controllable. Isolation of the emitter sets is then a necessary step to achieve balanced ionization in a variable ion mobility environment.

Figure 5:
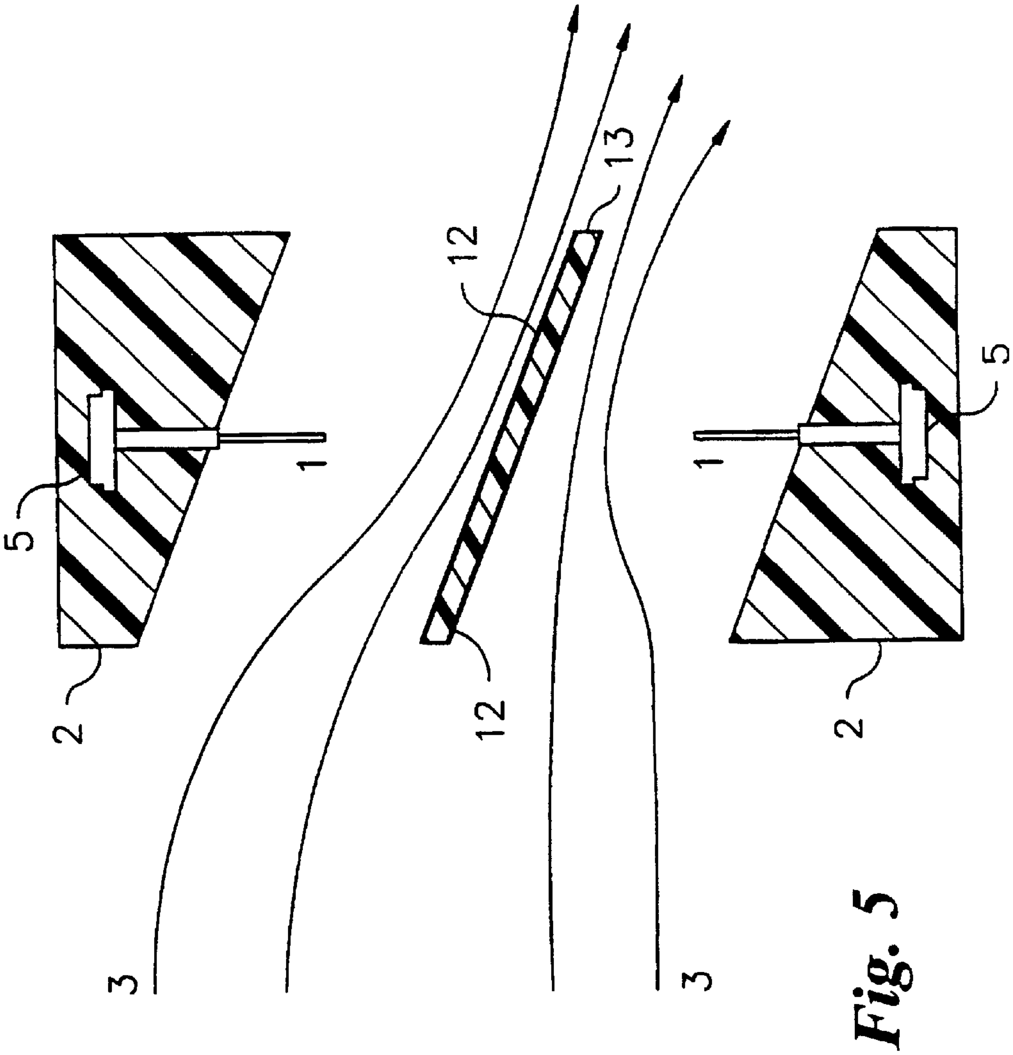
FIG. 5 is a generic needle-to-plane ionizer that isolates the positive and negative emitter sets in accordance with the present invention.

FIG. 5 illustrates a needle-to-plane ionizer. This ionizer is distinguished by separated collector surfaces 12 as the counterelectrodes. These collectors allow independent measurement and control of currents from the positive and negative emitter needles 1.

The emitter needles 1 extend about 5 mm beyond the surface of the insulation system 2. Each emitter set consists of four needles separated by about 40 mm. The distance between emitter needle 1 and counterelectrode 12 is 11 mm. The counterelectrode 12 is about 1.6 mm thick, two-sided, Cu-clad circuit board with insulative barrier 13. In this embodiment of the present invention, the counterelectrodes 12 are separated by an insulating barrier 13. This barrier 13 permits the separate measurement of ion currents from the separate emitters. The counterelectrodes 12 may also be a continuous metal element connected to a common terminal as reference for the emitter electrodes. Current transfer to an opposite emitter's counterelectrode is less than 1% in this electrode arrangement. It is further known that the ion distribution is minimally influenced by gas flows of a few meters per second and less than 1% of the corona ions are blown downstream toward static elimination.

Voltage-controlled power supplies were used with this ionizer (e.g. Sirnco CH-20). Each supply has a current-limit near 700 μA at potentials up to 20 kV dc. These supplies allow comparison of electrode sets at fixed potentials and the necessary current levels to support free-electron dominated currents.

Figure 6:
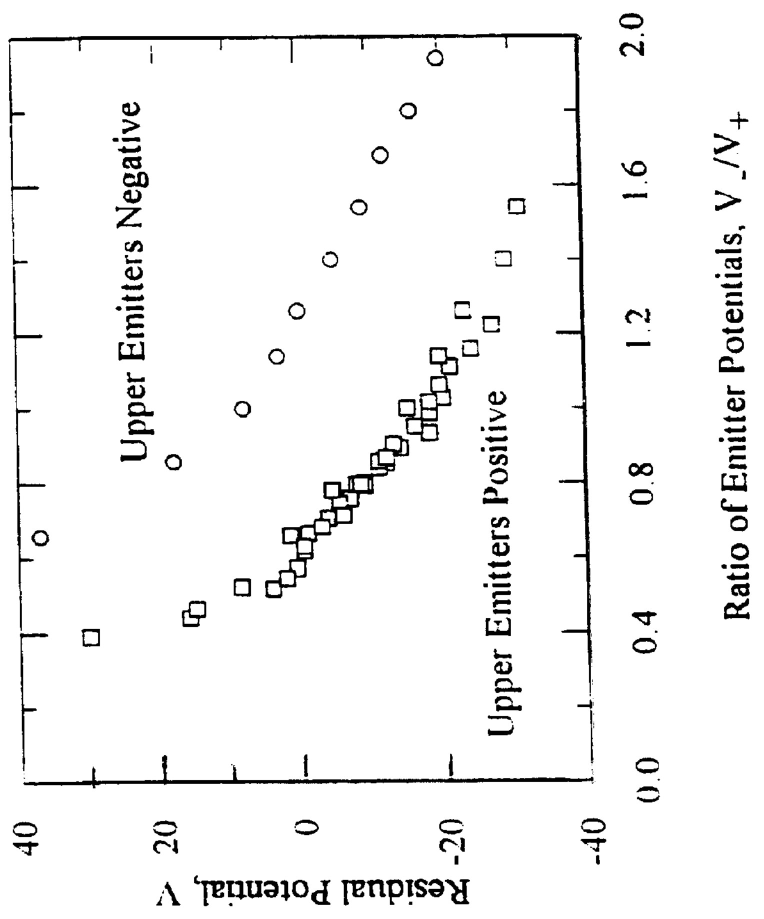
FIG. 6 shows the influence of the potential-ratio on the residual potential for the Needle-to-Plane Ionizer.
Figure 7:
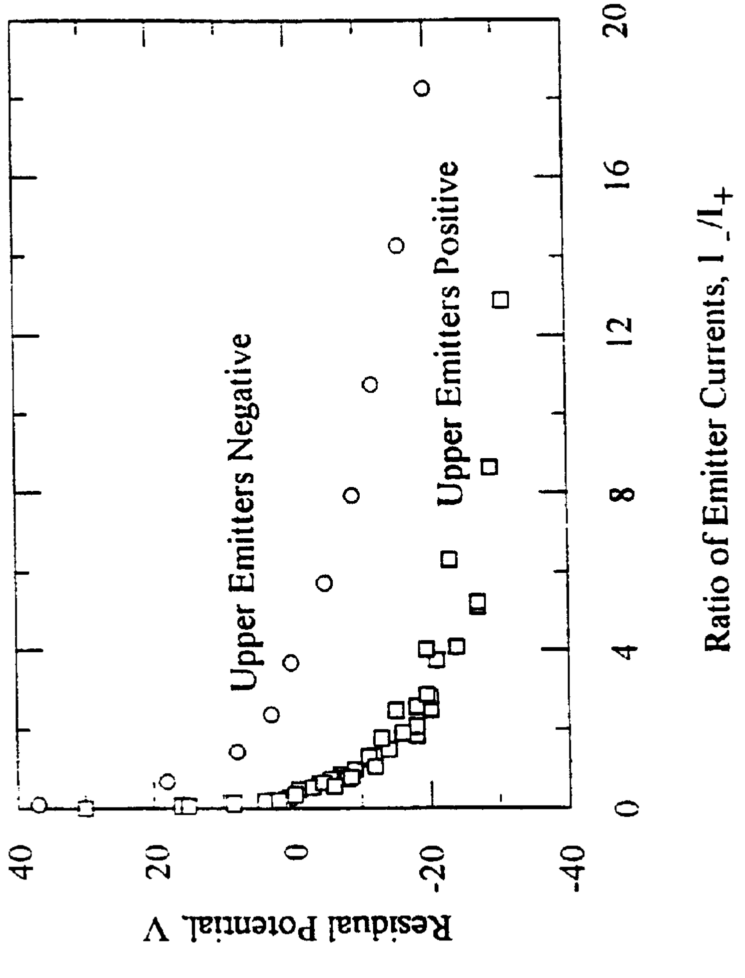
FIG. 7 shows the influence of current-ratio on the residual potential for the Needle-to-Plane Ionizer.

FIGS. 6 and 7 show the sensitivity of the balance condition to the potential and current-ratios, respectively ($V_+$= 5.0–8.5 kV, T=300 K). The data in this case was collected at room temperature and with a single fan operating in the chamber. The ratios can be adjusted to achieve positive and negative imbalances in the ionizer. This ability is necessary for control of ion balance.

As with the point-to-point ionizer at room temperature, the decay of a positive charge on the target is faster than for a negative charge. This result does not depend on which polarity is placed on the upper emitter array. The charge-decay times for the two polarities, however, are longer when the positive emitters are above the negative emitters. This finding is explained by the higher currents drawn by the negative emitters when they are above the positive emitters.

Tests were also performed with three fans at ambient temperature. The increased gas flow reduced the charge-decay times by about 32% for the negative target and 22.3% for the positive target, but did not significantly influence the I–V characteristics. (The balance sensitivity correlation, such as those shown in FIGS. 6 and 7, were also not changed.)

Figure 8:
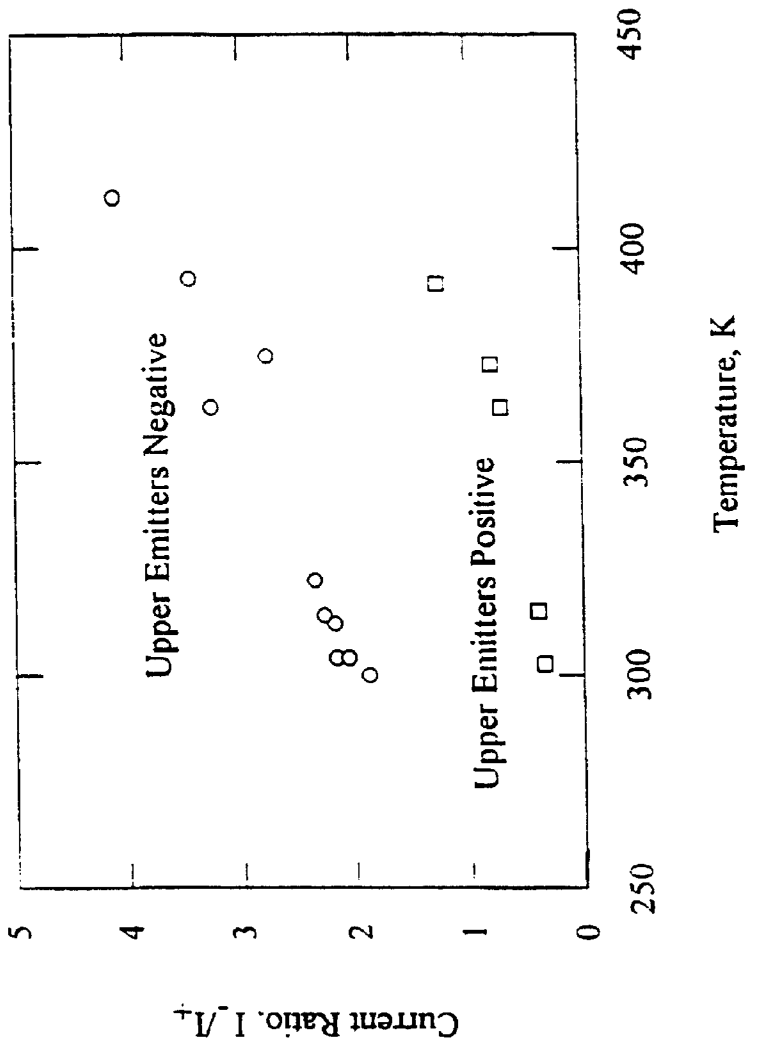
FIG. 8 shows the current-ratio needed to achieve balanced static elimination with needle-to-plane ionizer.

Balance is sustained with 7.5 kV on the positive emitter arrays by increasing the current-ratio—see FIG. 8. The charge-decay times for the point-to-plane ionizer decrease with increasing temperature as they did for the point-to-point ionizer, but are typically two to three times longer under similar conditions for the two ionizers. The longer charge decay times are associated with the change in orientation of the emitters from parallel to normal to the gas flow.

Figure 9:
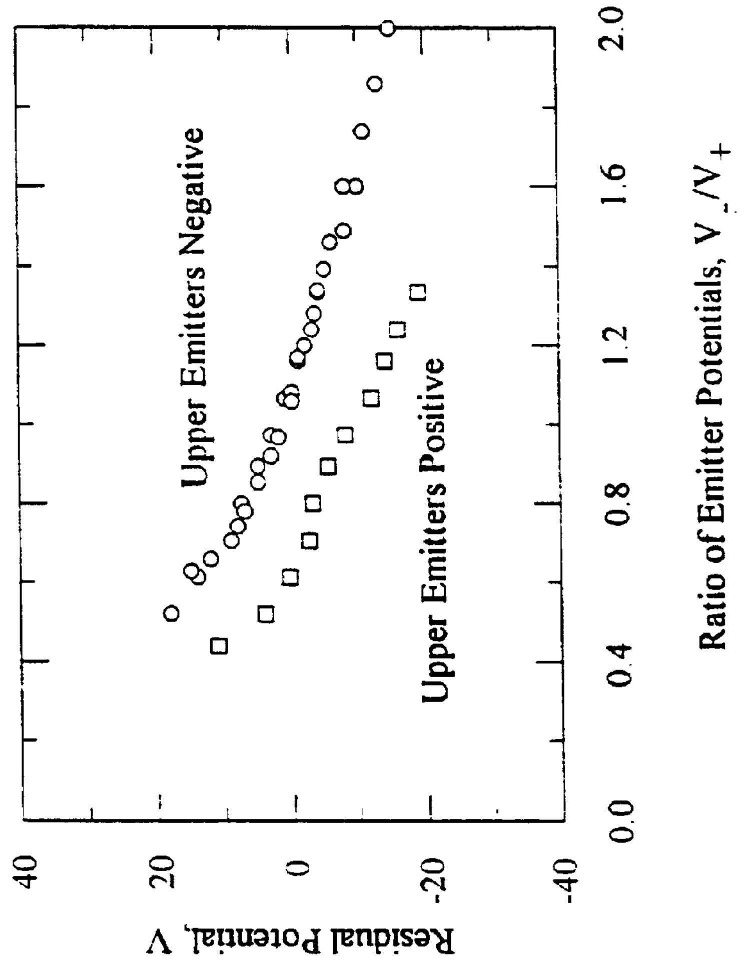
FIG. 9 illustrates the influence of potential-ratio on the residual potential with the Needle-to-Plane Ionizer.
Figure 10:
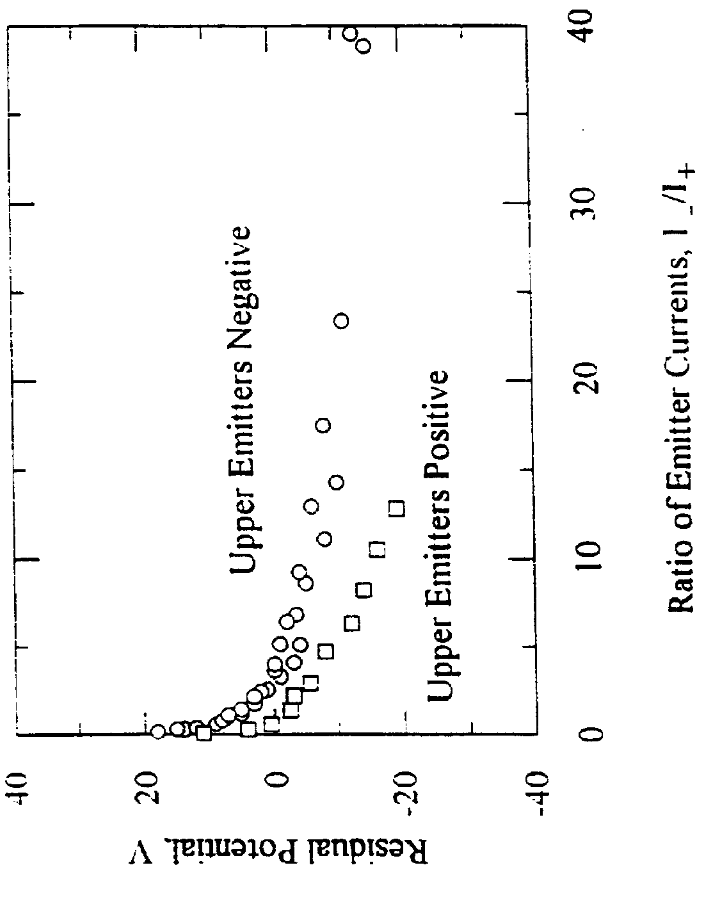
FIG. 10 illustrates the influence of current-ratio on the residual potential with the Needle-to-Plane Ionizer.

The stability condition for the balance also depends upon temperature. At higher temperatures the slopes of the curves become lower and the change in performance of the ionizer with reversal of polarity on the emitter arrays becomes smaller—compare FIGS. 6 and 7 with FIGS. 9 and 10. For FIGS. 9 and 10 ($V_+$=5.0–7.5 kV, T=363 K).

Figure 11:
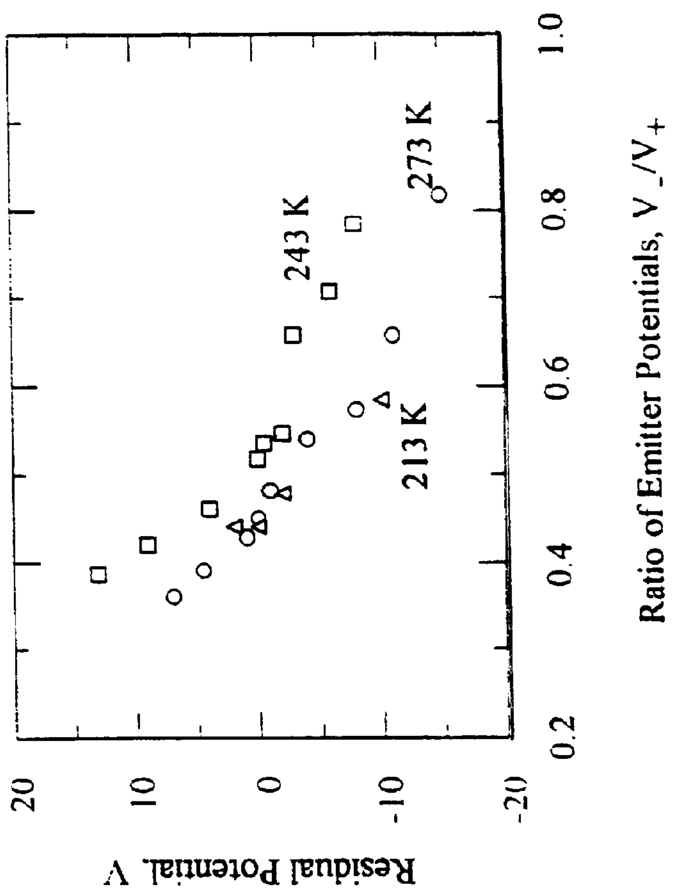
FIG. 11 shows the influence of potential-ratio on the residual potential for the Needle-to-Plane Ionizer.
Figure 12:
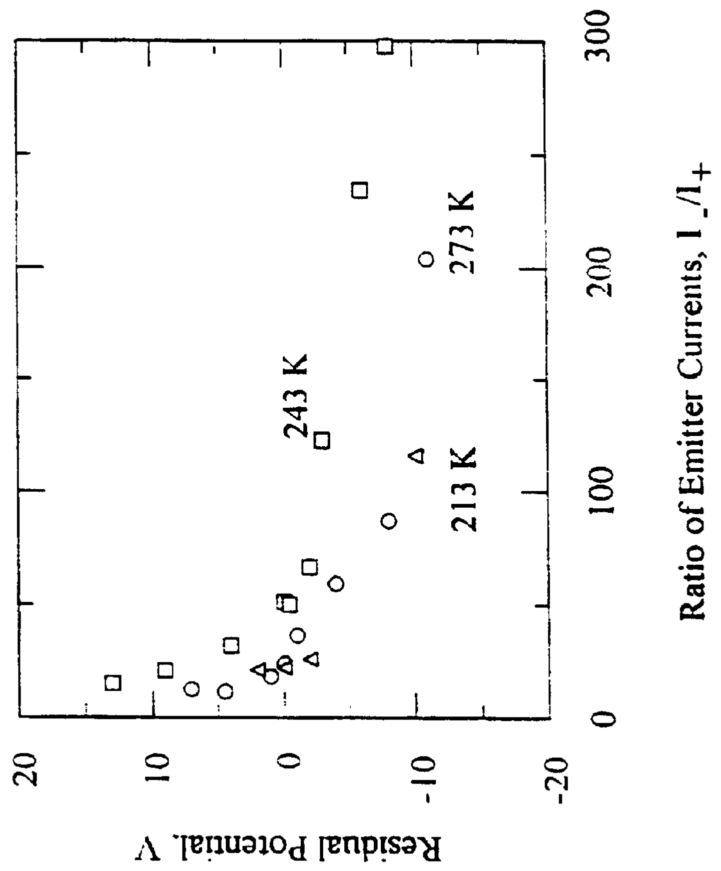
FIG. 12 shows the influence of current-ratio on the residual potential for the Needle-to-Plane Ionizer.

The balance sensitivity in the cold nitrogen environment remains stable. The slope of the curves, however, increases from values observed at elevated and room temperatures. FIGS. 11 and 12 summarize these data.

Figure 13:
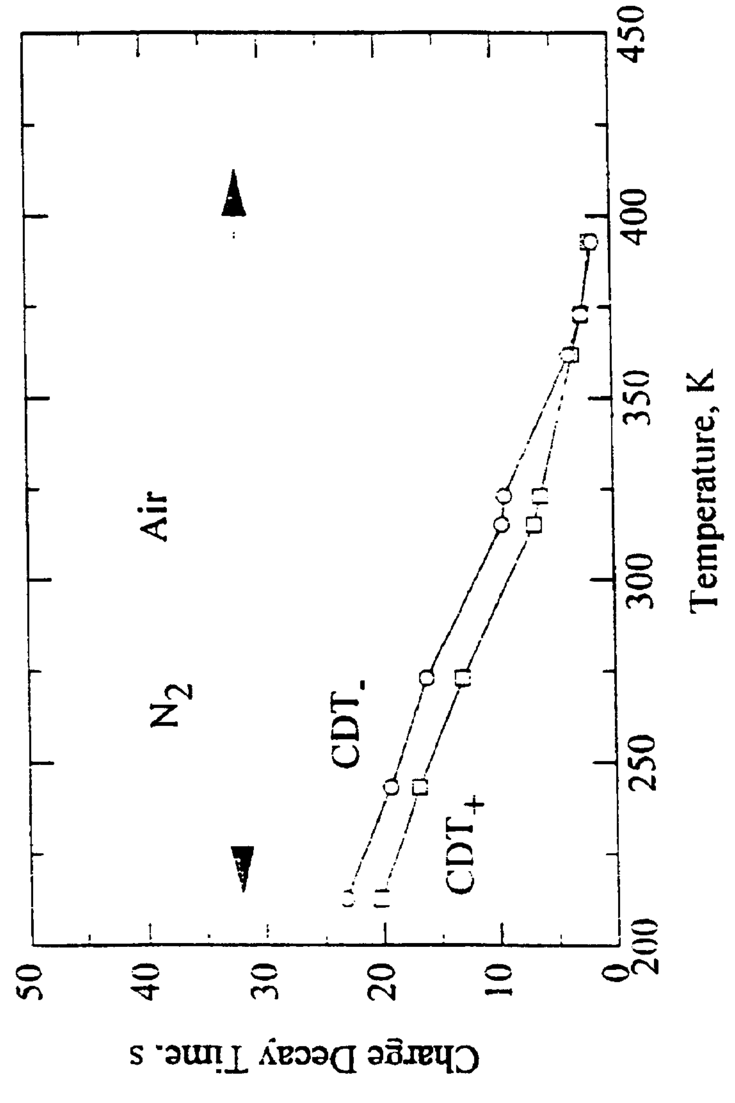
FIG. 13 illustrates the temperature dependence of the charge-decay times for the Needle-to-Plane Ionizer.

What is particularly important is that balanced static elimination can be achieved throughout the temperature range to about 213 K. The balance condition in terms of the ratio of electrode potentials does not change greatly over the entire temperature range from 213 K to 433 K. What does change greatly is the negative emitter current, and this is attributed to the high mobility of the negative charge carriers. The dependence of charge-decay time on temperature between about 213 K and about 393 K is illustrated in FIG. 13. When balance is achieved, the ratio of the charge-decay times is not as great as reported by others. Also, the. charge-decay times become longer at lower temperatures and continue theft dependence on gas flow in the chamber to move the carriers.

Proper selection of a power supply and control of the ratio of electrode potentials can assure balanced ionization and comparable charge-decay times over the temperature range from about 213 K to about 433 K. The turn-on voltages for the power supplies used with this ionizer were near 3.1 kV. This had little influence on the positive emitter potentials, but influenced the minimum operating point for the negative supplies at the lowest temperatures. The result is that there remains a small difference between the positive and negative charge decay times at low temperature.

Figure 14:
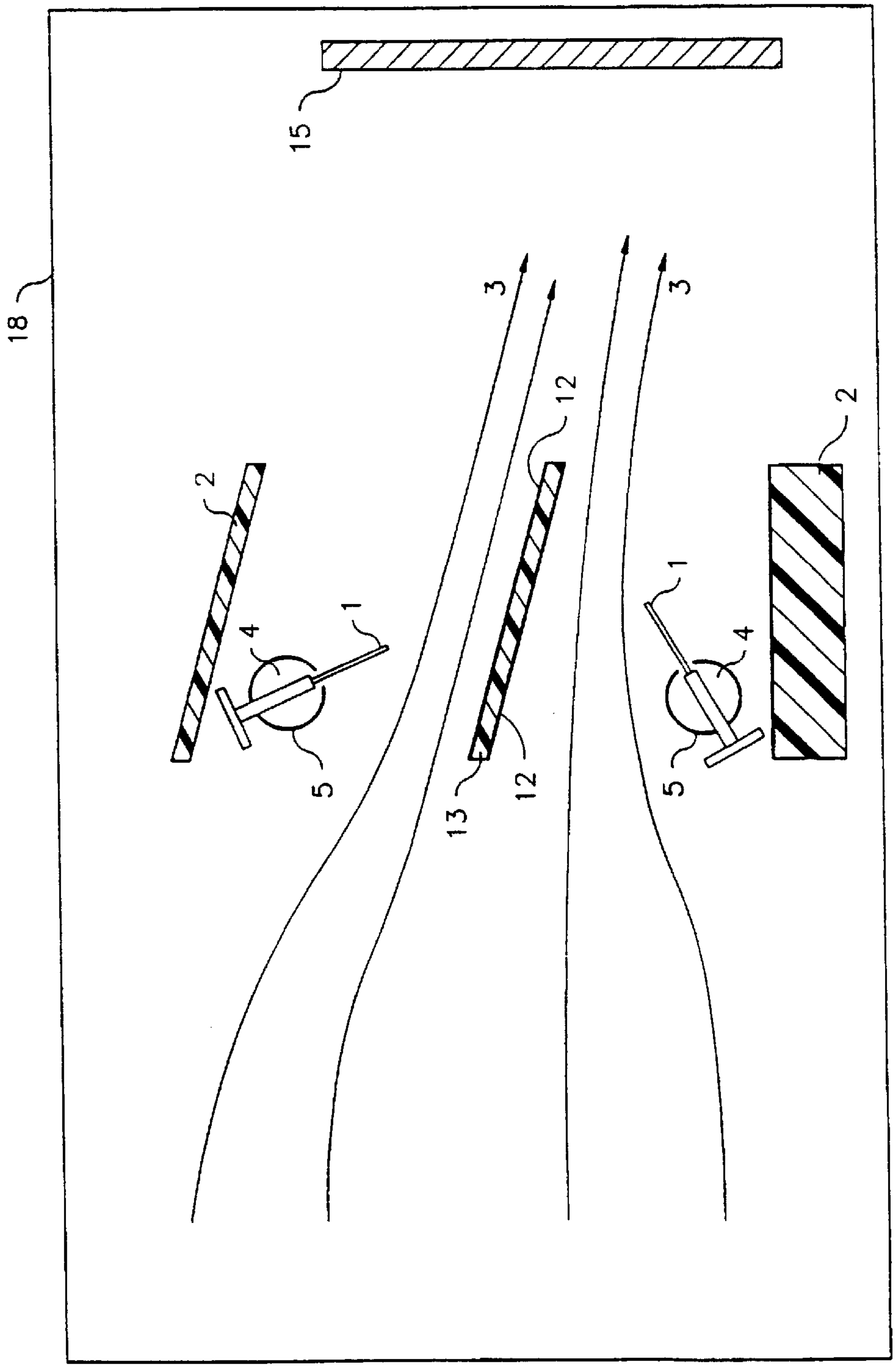
FIG. 14 is an ionizer in accordance with the present invention with needle-to-plane electrode geometry that isolates the positive and negative emitter sets.

FIG. 14 shows components of a hybrid ionizer of the present invention in an environmental chamber 18. Aside from achieving cost reduction in comparison with the embodiment illustrated in FIG. 5, the emitter configuration fosters improved ion entertainment towards the targets for static elimination.

The ionizer combines the forward-directed emitter needles 1 and the gas-injection features 4 of the needle-to-needle ionizer with the open point-to-plane emitter needles 1 and isolated counterelectrodes 12 of the needle-to-plane ionizer. Continuous adjustment is performed by rotation of the supporting tube 5 that supports the emitters, to control isolation and forward projection of the ion streams. The tube 5 serves additional functions as the high voltage terminal and air plenum for the gas-injection system. Although not essential to the control of ionization in a variable ion mobility environment, gas injection can be used with this ionizer to implement a gas-purged ionizer, or simply to support the maintenance of clean emitters. The counterelectrode set is fabricated from the same material as used in the needle-to-plane ionizer. Each emitter set consists of five emitter needles 1 with 25.4 mm spacing and point-to-plane distance of 9 mm. In disclosure of the invention the counterelectrodes 12 are separated by an insulating barrier 13. This barrier 13 permits the separate measurement of ion currents from the separate emitters. In practice, the counterelectrodes 12 may also be a continuous metal element connected to a common terminal as reference for the emitter electrodes. As with the other ionizers, gases in the gaseous environment 3 pass by the emitter assemblies and convey charge carriers to targets or workspaces 15 for static elimination.

Figure 15:
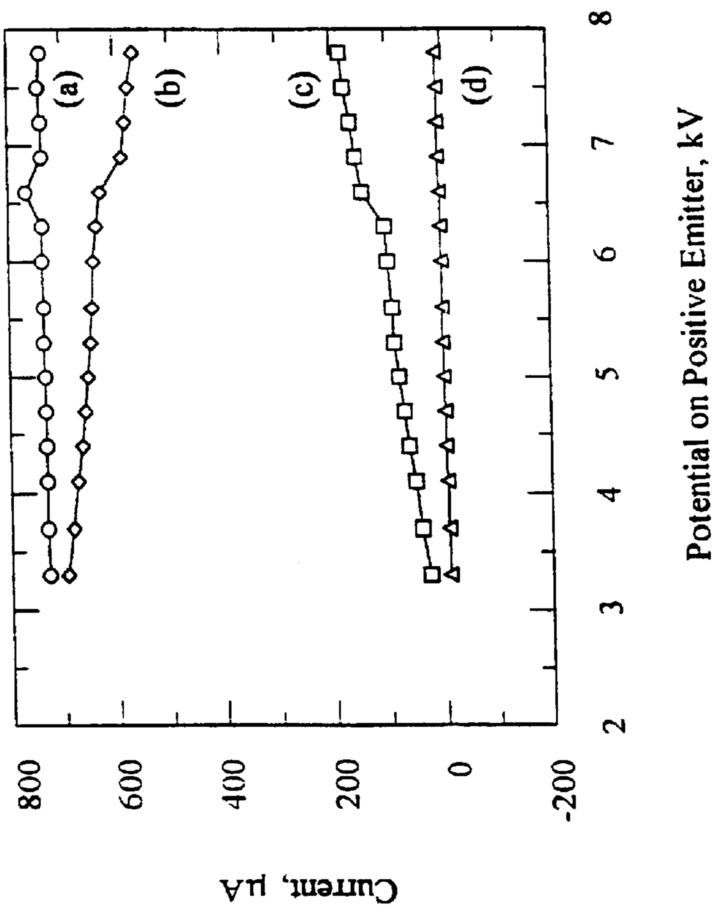
FIG. 15 illustrates the current transferred from negative to positive emitters for the needle-to-plane ionizer of the present invention wherein the emitters are directed parallel to shell surfaces.

The needle-tube ionizer allows adjustment of the ion distribution to isolate the emitter sets while still maintaining the advantages of a downstream component of ion momentum. It is found that the sum of the currents to the negative emitter's counterelectrode and the positive emitter's total current, less the current to the positive emitter's counterelectrode, is a constant—the current-limit of the supply. For a pure nitrogen environment, it is possible to measure the free electron current from the negative emitters to the positive emitters. FIG. 15 summarizes the results. FIG. 15 defines the following data sets: a) total negative current, b) current to counterelectrode for negative array, c) current to positive emitters, and d) current to counterelectrode for positive array. It is important to note that the current to the counterelectrode of the positive emitters is a measure of positive ion generation in the presence of the large, current-limited, free-electron current from the negative emitters. The total negative supply current is the maximum current from the supply—about 735 $\mu$A.

Figure 16:
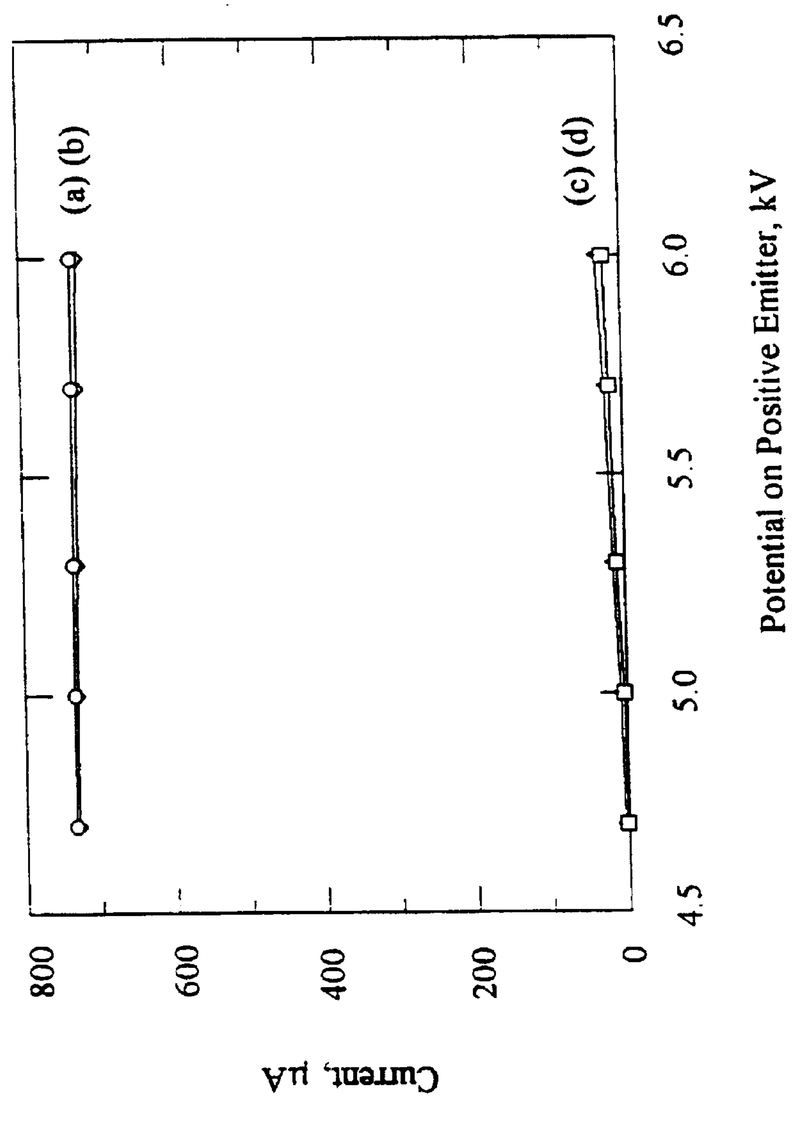
FIG. 16 illustrates the current transferred from negative to positive emitters for the needle-to-plane ionizer of the present invention wherein the emitters are directed as shown in FIG. 13.

To improve isolation between the emitter sets, the needles were directed as shown in FIG. 14. This action significantly reduced the current transfer between the sets, while reducing the potentials for corona onset. The results are shown in FIG. 16. FIG. 16 defines the following data sets: a) total negative current, b) current to counterelectrode for negative array, current to positive emitters, d) current to counterelectrode for positive array.

Figure 17:
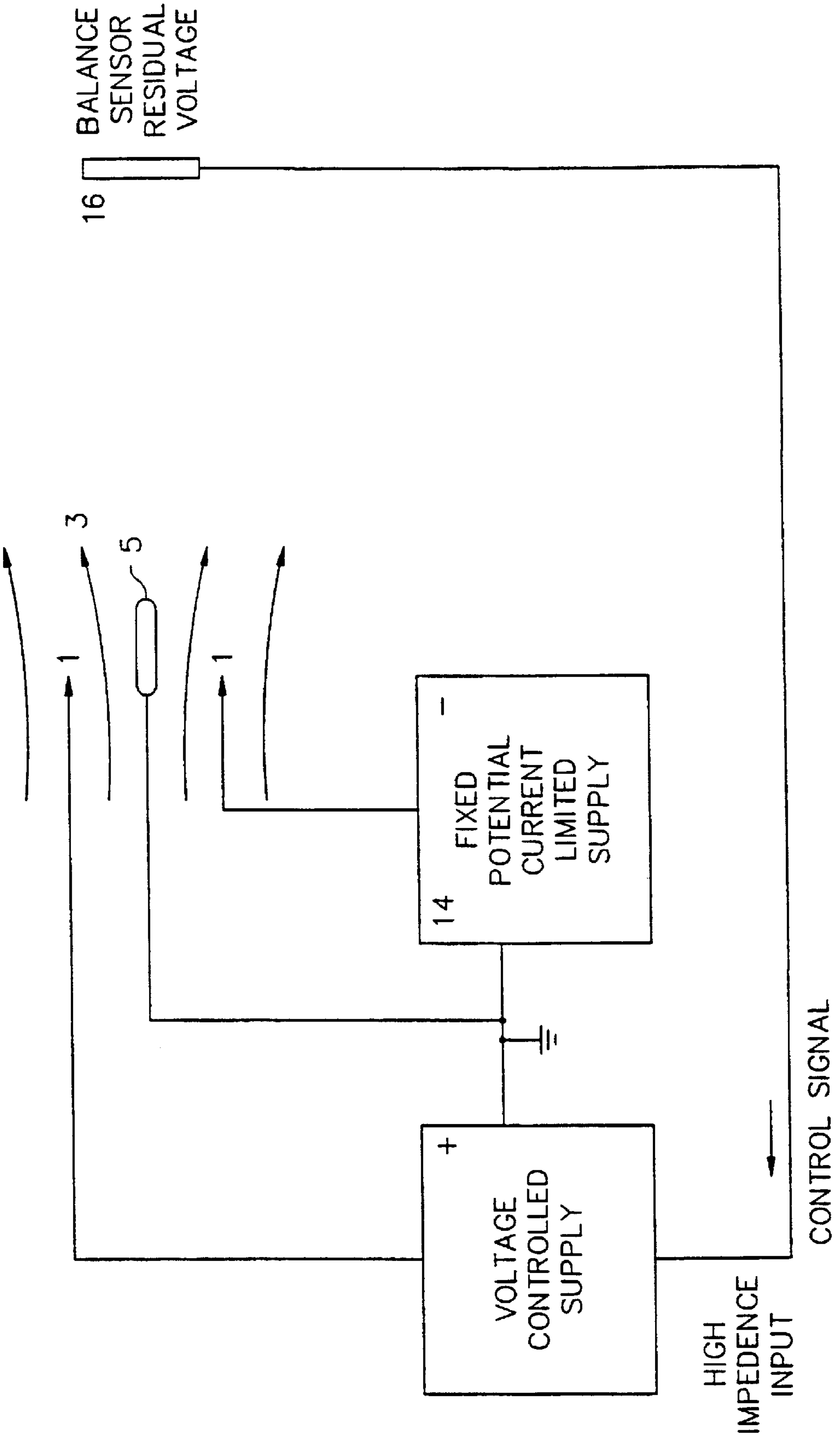
FIG. 17 is a functional schematic of the power controls for the electrical ionizer of the present invention.

As expected from the previously described experimental results, the emitter currents depend upon temperature. An operating mode must be selected that will serve ionization over the range of gas conditions and temperature. In this disclosed invention, as illustrated in FIG. 17, it is found that one should set a fixed potential on the negative power supply 14 and emitter needles 1. This potential must be sufficiently high to yield balanced ionization over the high temperature region with adjustment to the potential on the positive power supply 17 and emitter needles 1. The negative power supply 14 then must have a sufficient current-limit to control the negative, free electron current with automatic, or ballasting, reduction in the potential on the negative emitter set. At the same time, adjustment of the positive power supply 17 can bring the ionizer into balance. The target 16 is used to sense the balance condition with goal towards achieving zero voltage in the presence of ion streams from the positive and negative emitters. An imbalance voltage at 16 is fed to a conventional voltage-control circuit with high input impedance.

To achieve these goals for operation of the ionizer, the positive and negative emitter arrays must be isolated sufficiently to operate independently as described above for the needle-to-plane and needle-to-needle ionizers.

Figure 18:
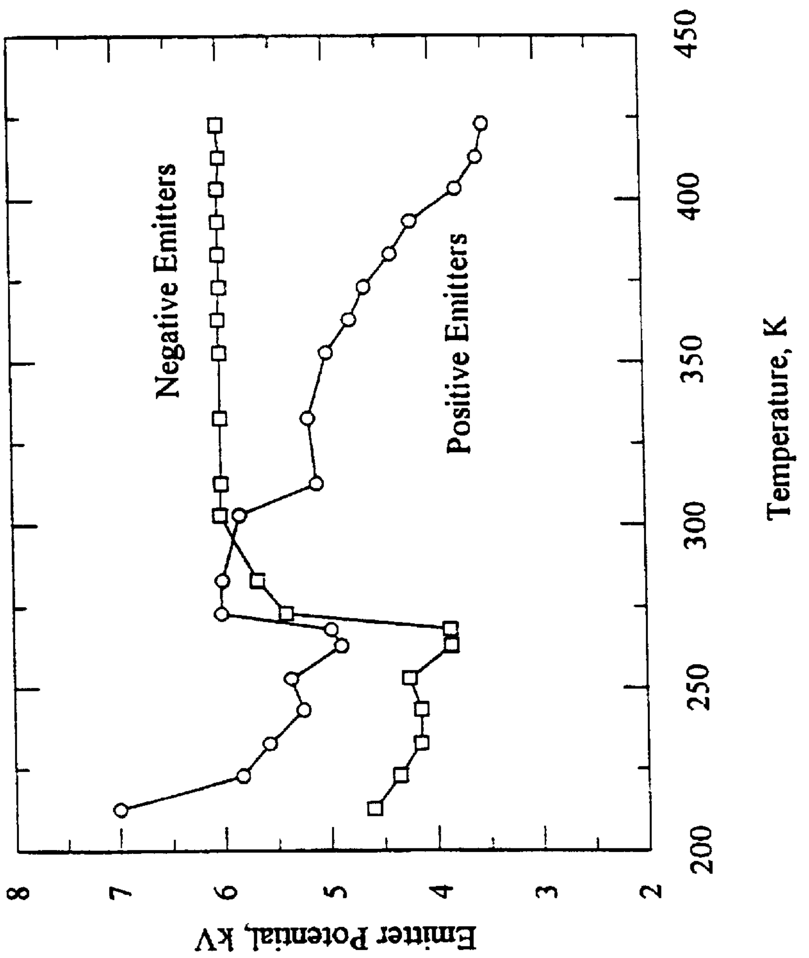
FIG. 18 shows the emitter potentials for the needle-to-plane ionizer of the present invention under balanced conditions.

FIG. 18 shows the dependence of the emitter potentials on temperature. The potentials shown on the graph were set to achieve conditions of ion balance at the target. Although nitrogen gas purges the chamber below room temperature, its effect did not become significant until below 273 K. Possibly, enough residual oxygen or other electronegative impurities remain in the chamber to permit formation of some negative-ion carriers. The chamber, however, is under positive pressure during cooling. Note that the 6.0 kV set-point for the negative power supply is maintained at room temperature and above. This potential drops to about 4.0 kV and then rises near 213 K. The positive potential needed to maintain balance increases with decreasing temperature and steps down when the transition to a nitrogen environment occurs. It then continues to rise with decreasing temperature to 213 K.

Figure 19:
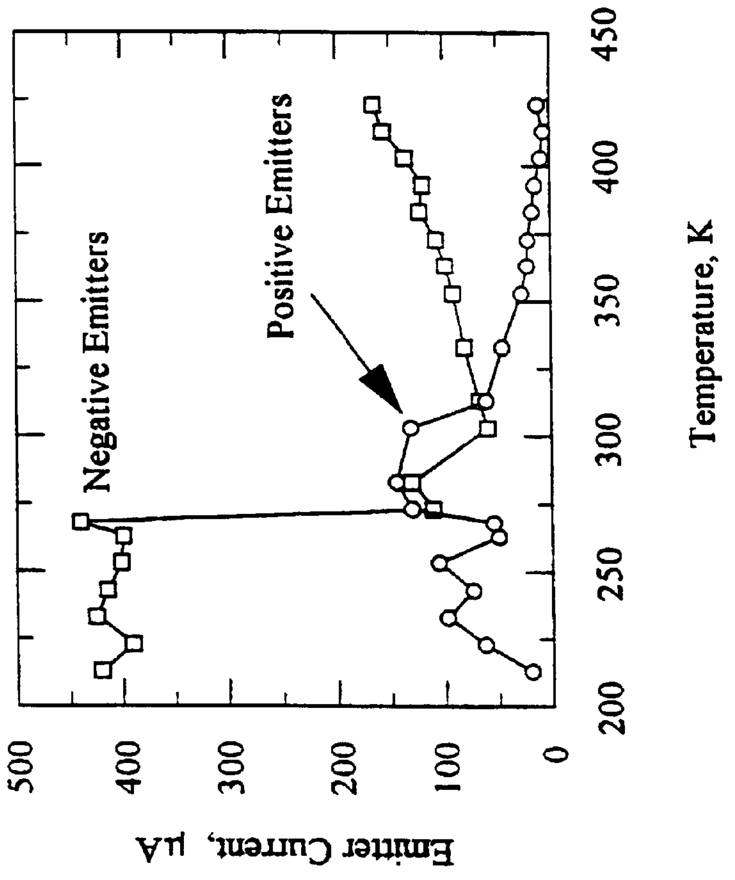
FIG. 19 shows the emitter currents for the needle-to-plane ionizer of the present invention under balanced conditions.

FIG. 19 shows the currents under balanced conditions. The negative current decreases (at fixed potential) with decreasing temperature above room temperature. At the transition to a nitrogen environment, the negative current rises to a large value that is determined by the current-limiting circuitry of the supply.

To maintain balance, the positive potential on the emitters must be increased with decreasing temperature. Even with the increase in positive potential, the positive current falls off in the low temperature, nitrogen corona.

Figure 20:
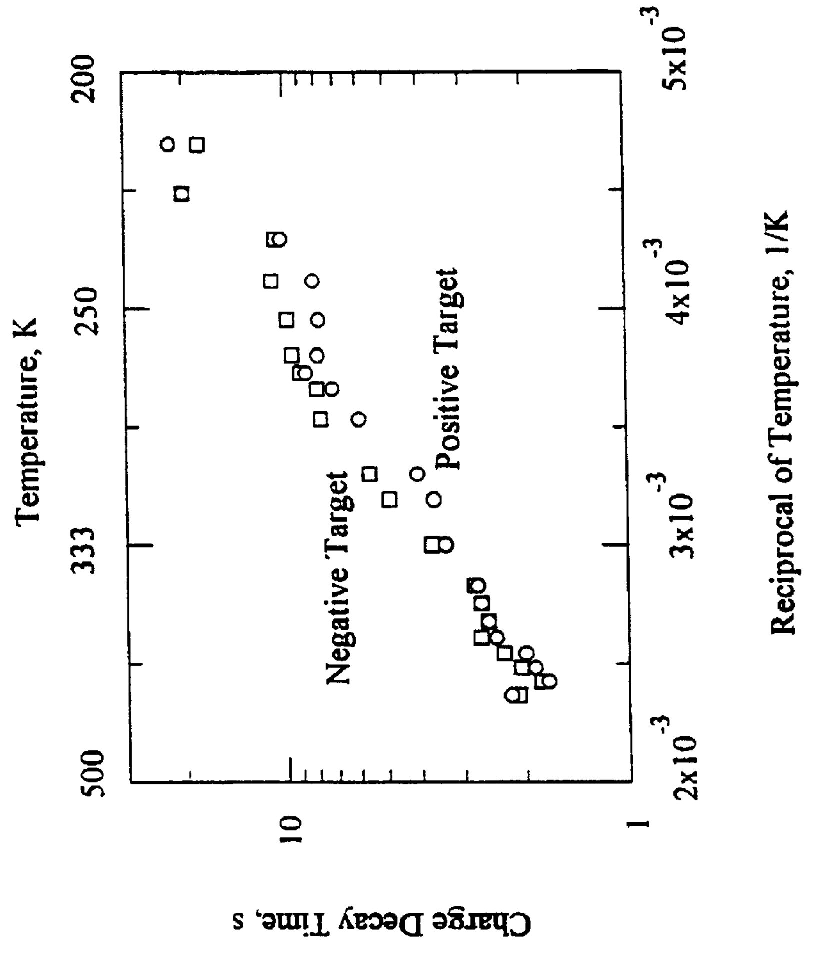
FIG. 20 shows stable static elimination by the needle-to-plane ionizer of the present invention.

FIG. 20 shows the dependencies of the positive and negative charge-decay times on temperature. The data has been plotted in semi-log form with respect to the charge-decay time and the reciprocal of the temperature. The data reveals a linear dependence that is common to both the positive and negative charge-decay times. This finding strongly suggests a common thermally-activated process is responsible for carrier generation and subsequent charge neutralization.

The findings again show, under balanced conditions, there is little practical difference between the charge-decay times at positive and negative polarity. Furthermore, under balanced conditions, the charge-decay data is continuous across the transition from nitrogen to air corona. The activation process and continuity of the charge-decay data is covered by adjustments to the power supply to maintain the balanced state over the transition.

Figure 21:
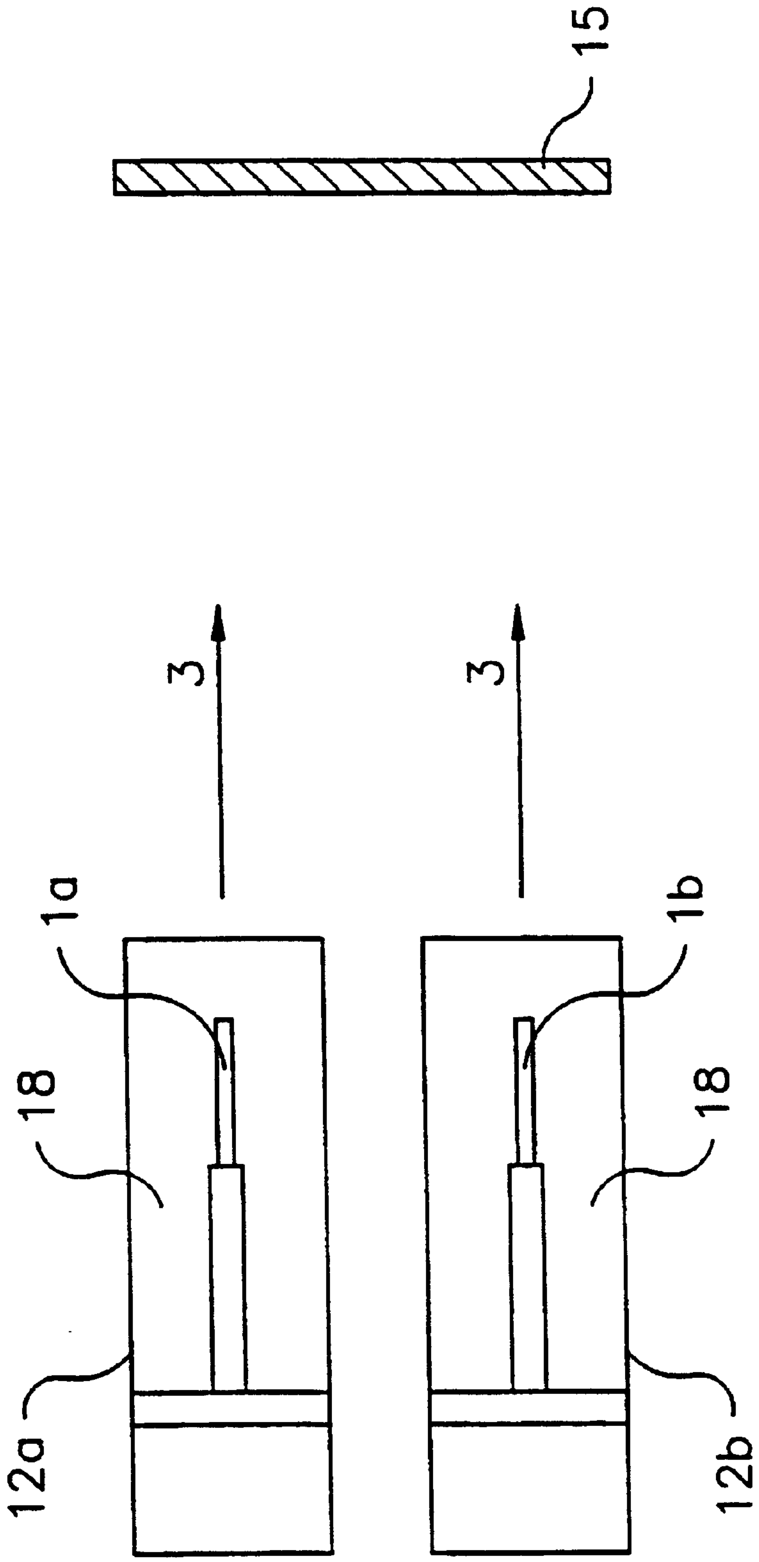
FIG. 21 shows an ionizer with needle-to-tube geometry.

FIG. 21 shows an alternate embodiment of the ionizer wherein the ionizer has a needle-to-tube geometry. The counterelectrode is a first tube 12*a* and a second tube 12*b*. The positive ion emitter 1*a* and negative ion emitter 1*b* are needle electrodes. The positive needle electrode 1*a* is housed in the first tube 12*a* The positive ions are directed towards an inside surface 18 of the first tube 12*a*. The negative needle electrode 1*b* is housed in the second tube 12*b*. The negative ions are directed towards an inside surface 18 of the second tube 12*b*. Gases from the gaseous environment 3 flow through the first tube 12*a* the second tube 12*b*. The gases from the gaseous environment 3 are directed towards the target or workspace 15 located downstream from the ionizer. The first and second tubes 12*a* and 12*b* respectively, are cylindrically shaped copper clad tubes having a glass-insulating interior barrier.

Those of skill in the art recognize that changes can be made to the above-described embodiments of the invention, without departing from the broad inventive concept thereof. It is understood, therefore, that this invention is not limited to the particular embodiments disclosed, but it is intended to cover all modifications which are within the spirit and scope of the invention as defined by the appended claims.

What is claimed is:

1. An ionizer which creates a corona current distribution having a balanced flow of positive and negative ions in a variable ion mobility gaseous environment, the balanced flow of positive and negative ions being directed toward a workspace or target located in the gaseous environment and downstream from the ionizer, the ionizer comprising:

(a) a counterelectrode having at least two spatially isolated ion collecting surfaces;

(b) a positive ion emitter which directs positive ions towards only a first ion collecting surface of the counterelectrode;

(c) a negative ion emitter which directs negative ions towards only a second ion collecting surface of the counterelectrode, the positive and negative ion emitters being spatially isolated from each other so that outputs of each of the emitters do not reach the other emitter; and (d) a control circuit which controls the output of at least one of the positive and negative emitters so as to cause a balanced flow of positive and negative ions to be emitted from the ionizer and directed towards the workspace or target, thereby creating a static-free environment at the workspace or target.

2. The ionizer of claim 1 wherein the control circuit comprises:

(i) a positive voltage controlled power supply for control of the positive ion emitter;

(ii) a negative fixed voltage potential current limiting power supply for the control of the negative ion emitter; and (iii) a balance sensor located near the workspace or target, the output being used to control the positive power supply in order to maintain a balanced ion state near the workspace or target.

3. The ionizer according to claim 2 wherein the balance sensor is a high input impedance sensor.

4. The ionizer of claim 2 wherein the control circuit increases the voltage from the positive voltage controlled power supply for control of the positive ion emitter when environmental temperature decreases.

5. The ionizer of claim 1 wherein the positive ion emitter and negative ion emitter each includes a supporting tube that supports the emitters and allows rotational positional adjustment so that the emitters may be adjusted for independent operation and forward projection of the balanced flow of positive and negative ions towards the workspace or target.

6. The ionizer of claim 5 wherein the supporting tube is used as an air plenum for gas-injection into the environment.

7. The ionizer of claim 1 wherein the ionizer has a needle-to-tube geometry, the counterelectrode is a first tube and a second tube, and the positive and negative ion emitters are needle electrodes, the positive needle electrode being disposed in the first tube wherein the positive ions are directed towards the inside surface of the first tube, the negative needle electrode being disposed in the second tube wherein the negative ions are directed towards the inside surface of the second tube.

8. The ionizer of claim 7 wherein the first and second tubes are cylindrically shaped stainless steel tubes having a fiberglass G-7 interior barrier.

9. The ionizer of claim 1 wherein the ionizer has a point-to-plane geometry, the counterelectrode being a single plane having two opposing ion collecting surfaces, and the positive and negative ion emitters being needle electrodes.

10. The ionizer of claim 1 wherein the positive ion emitter and the negative ion emitter each have a tip that is directed downstream from the ionizer.

11. A method of creating a corona current distribution having a balanced flow of positive and negative ions, the balanced flow of positive and negative ions being directed toward a workspace or target, the method comprising:

(a) providing a variable ion mobility gaseous environment, the workspace or target being located in the gaseous environment;

(b) operating an ionizer in the gaseous environment to create the corona current distribution, the workspace or target being located downstream from the ionizer, the ionizer including a positive ion emitter and a negative ion emitter;

(c) controlling the negative ion emitter with a negative fixed voltage potential current limiting power supply; and (d) controlling the positive ion emitter with a positive voltage controlled power supply based on the output signal of a balance sensor located near the workspace or target so as to cause a balanced flow of positive and negative ions to be emitted from the ionizer and directed towards the workspace or target, thereby creating a static-free environment at the workspace or target.

12. The method of claim 11 wherein the variable ion mobility gaseous environment provided in step (a) is substantially nitrogen.

13. The method of claim 11 wherein the variable ion mobility gaseous provided in step (a) is between about 213 degrees Kelvin to about 433 degrees Kelvin.

14. A method of creating a corona current distribution having a balanced flow of positive and negative ions, the balanced flow of positive and negative ions being directed toward a workspace or target, the method comprising:

(a) providing a variable ion mobility gaseous environment, the workspace or target being located in the gaseous environment;

(b) operating an ionizer in the gaseous environment to create the corona current distribution, the workspace or target being located downstream from the ionizer, the ionizer including a counterelectrode, a positive ion emitter, a negative ion emitter, and a control circuit;

(c) directing positive ions from the positive ion emitter towards only a first ion collecting surface of the counterelectrode;

(d) directing negative ions from the negative ion emitter towards only a second ion collecting surface of the counterelectrode, the positive and negative ion emitters being spatially isolated from each other so that outputs of each of the emitters do not reach the other emitter; and (d) using the control circuit to control the output of at least one of the positive and negative emitters so as to cause a balanced flow of positive and negative ions to be emitted from the ionizer and directed towards the workspace or target, thereby creating a static-free environment at the workspace or target.

15. The method of claim 14 wherein the variable ion mobility gaseous environment provided in step (a) is substantially nitrogen.

16. The method of claim 14 wherein the variable ion mobility gaseous provided in step (a) is between about 213 degrees Kelvin to about 433 degrees Kelvin.

17. The method of claim 14 wherein the control circuit comprises (i) a positive voltage controlled power supply, (ii) a negative fixed voltage potential current limiting power supply, and (iii) a balance sensor located near the workspace or target, step (d) further comprising:

(i) controlling the positive ion emitter with the positive voltage controlled power supply;

(ii) controlling the negative ion emitter with the negative fixed voltage potential current limiting power supply; and (iii) using the output of the balance sensor to control the positive power supply in order to maintain a balanced ion state near the workspace or target.

* * * * *